March 29, 1966  A. SWEENY, JR  3,243,444
MANUFACTURE OF FLUORINE DERIVATIVES OF PHENANTHRENEQUINONE
Filed June 27, 1962
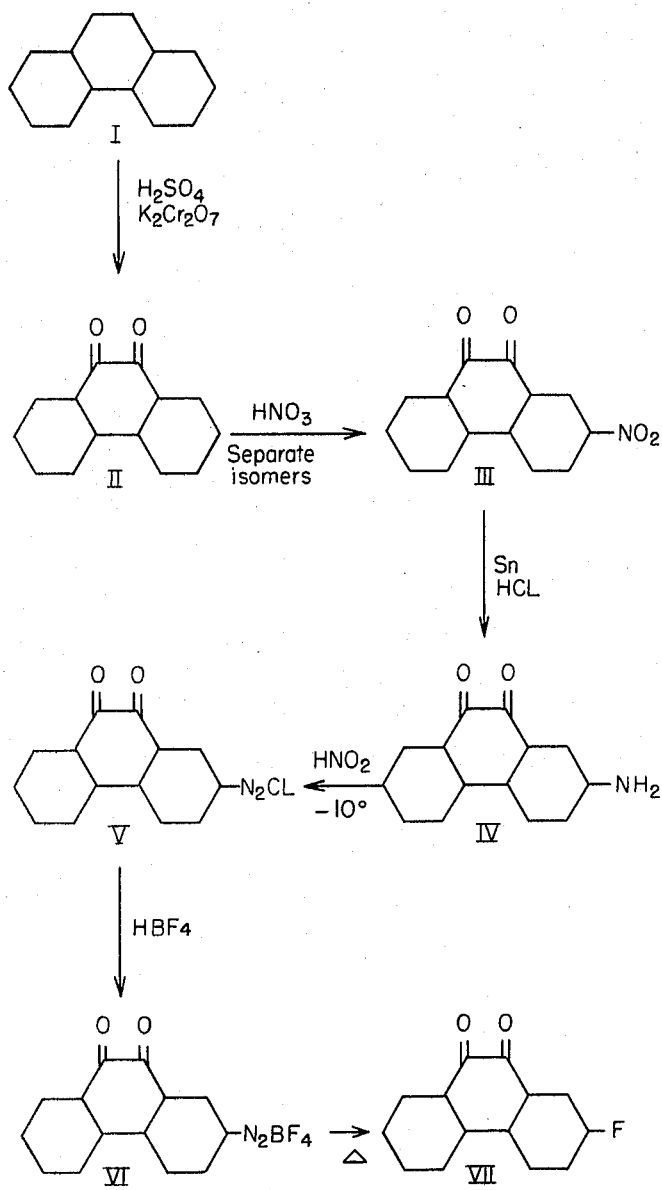
INVENTOR.
Arthur Sweeny, Jr.
BY
Robert S. Dunham
Attorney United States Patent Office 3,243,444
Patented Mar. 29, 1966

3,243,444
MANUFACTURE OF FLUORINE DERIVATIVES
OF PHENANTHRENEQUINONE
Arthur Sweeny, Jr., 58 Guion St., Pleasantville, N.Y.
Filed June 27, 1962, Ser. No. 205,794
17 Claims. (Cl. 260—396)

This application is a continuation-in-part of my copending application Serial No. 24,751, filed Apr. 26, 1960, for Manufacture of Fluorine Derivatives of Phenanthrenequinone, now abandoned.

This invention relates to new chemical compounds of the class of derivatives of phenanthrenequinone and to methods of preparing such compounds. In particular, the new compounds are fluorine derivatives, specifically the 2-fluoro and 4-fluoro derivatives of phenanthrenequinone, which it has been found possible to prepare, as by the procedure hereinbelow described, and which are believed to possess valuable properties, for example as an agent useful in aid of experimental research relating to cancer.

Although in some cases the addition of a fluorine atom to an organic molecule has been found to enhance the physiological activity of the compound, and although some quinones have given indication of carcinogenic activity, the latter property does not appear to have been universally associated with fluorine-containing substances, nor has phenanthrenequinone given any unusual promise of value in such respects. The new compounds of the present invention, however, are believed to have unusual significance, as a tool in the investigation of carcinogenic and carcinostatic conditions, with corresponding utility as indicated above. Thus, for example, a compound which represents a specific feature of the invention, viz. 2-fluoro-9,10-phenanthrenequinone, appears to constitute a biochemical agent of unusual potency, possibly in carcinogenic action, so that it has an indicated field of use in cancer research and the like, where such agents are employed for investigating the production of cancer under controlled conditions, e.g. in experimental animals. Indeed, some demand for the new compounds in furtherance of such research has already appeared.

Although it is conceived that other procedures may be employed to prepare the stated susbtances, the invention also extends to improvements in certain stages of synthesis, and thus to the provision of a method involving certain new or improved operations, whereby a compound of the stated character is produced in the desired, ultimately pure state. The process is both convenient and reliable, so that results can be reproduced without uncertainty or unusual delicacy of control.

By way of illustration, the accompanying drawing shows, in summary form, the series of reactions of one process, i.e. one form of the new procedure, whereby phenanthrene is successively treated to yield the desired fluoro compound, specifically for example, the 2-fluoro derivative of phenanthrenequinone.

It will be noted preliminarily that the illustrated process includes a novel adaptation of a reaction of the so-called Schiemann type, involving the use of fluoboric acid to produce the compound identified as VI. In another form of the improved procedure of the present invention, a modified operation is utilized, embracing the use of hexafluorophosphoric acid (HPF$_6$) to yield a diazonium hexafluorophosphate (—N$_2$PF$_6$) of phenanthrenequinone, corresponding to compound VI, which is thereafter decomposed as described below.

Referring to the drawing, it will be seen that phenanthrene, I, was employed as the starting material and was thus first oxidized, by conventional operation, to yield phenanthrenequinone, II. The latter compound was then nitrated, resulting in the production of the 2- and 4-nitro isomers, of which one was separated, e.g. the 2-nitro compound as shown at III. The reduction of the 2-nitro isomer to provide the corresponding 2-amino phenanthrenequinone, IV, was immediately followed by diazotization, yielding the diazonium salt (chloride), V, which was converted to the corresponding fluoborate, i.e. the diazonium fluoborate, VI, in the succeeding step of synthesis. Finally, the fluoborate was decomposed by heating at reduced pressure, yielding a tarry mixture containing the ultimate, new fluoro compound, being the 2-fluoro derivative of phenanthrenequinone, VII, which was then separated by sublimation at reduced pressure, and purified. It will be understood that although the operations have been illustrated for preparing the 2-fluoro compound, like procedure can be employed, as by separating the other isomer at stage III, to yield the isomeric 4-fluoro derivative of phenanthrenequinone.

If as here, the synthesis is started with phenanthrene rather than the quinone, the production of the latter compound, II, is achieved by conventional oxidation, for instance by chromic acid, specifically with the use of potassium chromate and sulfuric acid, the product II being suitably purified in a known manner. The nitration of the nitro compound is conventionally effected in a way which has been long known, yielding a mixture of the 2- and 4-nitro isomers, which are then separated by fractional crystallization from ethanol. In the present process, further re-crystallization was performed in order to obtain an exceptionally pure lot of the selected isomer, e.g. the 2-nitro compound. This special operation was found necessary in order to avoid uncertainty in the preparation of the next intermediate, viz. the amino compound IV, inasmuch as the latter cannot be characterized by a melting point.

It was found that a particularly reliable and consistent mode of reducing the 2-nitro compound involved the use of tin and hydrochloric acid, and reduction by this operation was therefore selected. In this stage the reactions involved the production of the tin double salt and decomposing the same with hydrogen sulfide. Because the amino compound IV was found to have poor solubility for diazotization, a special procedure was devised for keeping the amine in solution and thus enabling the preparation of the diazonium salt to proceed directly thereafter. It was discovered that the amino derivative is soluble in dioxane, and the reduction step was carried out so as to precipitate the tin sulfide in a water-dioxane mixture, i.e. leaving the desired 2-amino compound, IV, in solution. Thus upon removal of the tin sulfide and appropriate cooling of the solution, the diazotization was effected with nitrous acid, specifically using sodium nitrite and hydrochloric acid. The resulting solution of diazonium chloride of phenanthrenequinone was then treated with cold fluoboric acid at a low temperature, and a precipitate of the diazonium fluoborate was collected after allowing the suspension to stand at or below zero degrees C. for an extended length of time. This period of standing, e.g. 24 hours, effecuated completion of the reatcion and accumulation of the precipitate.

The resulting fluoboric compound was separated, washed and dried, for example as described in further detail hereinbelow, and it was then subjected to treatment for decomposition to produce the ultimately desired fluorine derivative. It was discovered that these final stages could be performed with special effectiveness under reduced pressure, and in particular by continuing the heating and reduced pressure treatment in such way as to cause sublimation of the compound, for deposit on a suitably chilled surface exposed to the vapors. This method afforded a good separation of a crude product from the tarry material produced by the initial decomposition. The crude product was finally purified, as by recrystallization from a solvent and resublimation under vacuum.

As obtained by procedure more specifically exemplified below, the product compound, VII, was identified as 2-fluoro-9,10-phenanthrenequinone, in the crystalline form of orange-yellow needles. It is soluble in concentrated sulfuric acid, forming a dark green solution from which it may be recovered with unchanged melting point, on dilution with water. The compound is thus insoluble in water, slightly soluble in ether, and moderately soluble in benzene, toluene, ethanol and dioxane. It was found that 23 mg. of the compound dissolves in 1 ml. of boiling glacial acetic acid; from such solution 20 mg. of the compound crystallizes on cooling. As a further characterization of the product it was observed that upon treating it with 2,4-dinitrophenylhydrazine, a bright scarlet product is formed. After repeated recrystallizations from acetone, e.g. 4 times, the last-mentioned material was found to have a substantially definite melting point of 340° to 345° C.

Although the relatively complex nature of the sequential steps of synthesis and the requirement of obtaining good separation of the desired compound from other reaction products place considerable limitation on the actual yield of the final compound, the procedure is nevertheless an effective and successful one in that the specific substance is in fact finally achieved despite experimental difficulties which were overcome by the described procedure. The process is readily reproducible and the fluoro derivative can be obtained, as stated, in good purity. It has utility as indicated above, for instance as a research agent. Again, while in one specific sense the invention is primarily concerned with the 2-fluoro compound, the process is applicable to the production of the other isomer, e.g. 4-fluoro-9,10-phenanthrenequinone, for which similar utility is indicated.

A specific example of the process, i.e. of operations employed to produce 2-fluoro-9,10-phenanthrenequinone is as follows:

As a first step, phenanthrenequinone (II) was prepared from phenanthrene (I) by oxidation with chromic acid, using potassium chromate and sulfuric acid, this operation being well known and therefore requiring no detailed account. A suitable process, for example, is as reported by Oyster and Adkins, Journal American Chemical Society, vol. 43, 208 (1921), describing a modification of a still earlier procedure. For the operations described below, 100 gram lots of phenanthrene were oxidized in this manner, the improved product being purified by means of the bisulfite addition compound, and subsequent crystallization from glacial acetic acid, as will be understood by those familiar with the known procedure as mentioned above.

Nitration of phenanthrenequinone was performed in a conventional way, using 30 gram lots of the substance. Specifically, this operation, using nitric acid, was carried out by the method described by Schmidt and Spoun, Berichte, 55, 1199 (1922). The material resulting from this operation contained a mixture of the 2- and 4-nitro isomers, which were separated, likewise by the published method, using fractional crystallization from ethanol. The 2-nitro compound, crystallizing out (away from the other), was thus isolated, viz. 2-nitro phenanthrenequinone. In order to obtain it in a high state of purity, it was repeatedly recrystallized from glacial acetic acid, the nitration having been carried out on sufficient lots to provide a resulting quantity of 80 grams of the compound (III) which in its thus purified state was found to melt at 265°–268° C.

For confirmation of the composition of this substance, 0.5 gram of it were sublimed twice under a reduced pressure of 3 mm., with the product condensing on a chilled surface each time. The resulting, even more highly purified sample of the 2-nitro compound was found to melt at 270°–272° C. with partial sublimation. Its analysis was: calculated for $C_{14}H_7O_4N$: C, 66.41; H, 2.79; N, 5.53. Found: C, 66.33; H, 2.85; N, 5.50. This treatment by sublimation was performed simply for purposes of test, and was not needed in the actual procedure here described as involving the making and use of the compound.

It may be noted that all melting points herein were taken using an aluminum block as described by L. Fieser, "Experiments in Organic Chemistry," page 251, FIG. 44.5, 3rd Edition, D. C. Heath and Co., Boston 1955, and are uncorrected.

The nitro compound, III, was then subjected to further treatments, successively yielding compounds IV and V and ultimately producing compound VI, viz. 2-diazonium fluoborate-9,10-phenanthrenequinone. Specifically, 10 grams of the nitro compound were reduced according to the method of Schmidt and Spoun (cited above) except that instead of suspending the tin double salt in a liter of water, a mixture of 200 ml. dioxane and 800 ml. of water was used. It will be understood that the treatment with tin and hydrochloric acid reduced the nitro group to an amino group, yielding an amine which appeared as the double salt (i.e. chloride) of such amine and tin, and which was then treated with hydrogen sulfide. After the tin sulfide precipitate was filtered off (such precipitate having resulted from decomposition of the tin double salt with hydrogen sulfide), the precipitate was washed with four 25 ml. portions of dioxane and these portions were added to the solution of the amine (IV) in the dioxane-water mixture. Then air was blown through the solution for 2 hours.

As explained hereinabove, the mixture of dioxane and water is advantageous in establishing a solution of the amine (in chloride form), which is relatively insoluble in water alone. There is no need to separate the amine in free form, and the amine chloride is effectively provided in solution (in the dioxane-water mixture) as is desirable for the diazotization.

The solution was next cooled to −10° C., with stirring, and after adding such further hydrochloric acid as necessary for the desired reaction (with nitrite, and to produce the diazonium chloride) and for maintenance of acid conditions, 3.5 g. of sodium nitrite in 20 ml. of water was added until a positive test with starch iodide paper was obtained, such test being a measure of care to avoid the presence of excess nitrous acid. The reaction product of the diazotization operation just described (performed in the presence of chloride ions), was the diazonium chloride (V).

Although it could be made available in other ways, fluoboric acid was specially prepared for the next step (conveniently at the same time that the diazotization was effected), by adding 3.5 grams boric acid to 9 grams of hydrofluoric acid (48%) cooled in an ice-salt bath.

The cold fluoboric acid thus prepared was then poured into the diazonium solution (V) which had been kept below zero degrees C. Stirring was continued for two hours and the mixture was then allowed to stand on ice in a refrigerator for 24 hours. By these operations, the diazonium fluoborate (as named above, compound VI) was formed, first into suspension and then collecting as a form of precipitate in the liquid. The precipitated fluoborate was thereafter filtered with suction, washed with ice water and dried in vacuum desiccator, first over concentrated sulfuric acid (Sp. gr. 1.84), and then over phosphorus pentoxide. It was found greatly preferable not to wash the precipitate with alcohol and ether as has been recommended by some investigators, for the case of a different fluoborate organic compound.

The diazonium fluoborate (VI) was thus produced as a dry solid, of yellow-brown character. It was found to be hygroscopic, decomposing at 115° C. From 5 to 6 grams of this material were obtained, having started with 10 grams of compound III.

The final reaction stage in the procedure constituted the decomposition of the diazonium fluoborate and the sublimation of the resulting 2-fluoro compound. Specifically, 6 grams of the fluoborate (VI) was placed in the bottom of a large test tube (45 x 150 mm.), fitted with a two-holed rubber stopper. In one hole of the stopper there was disposed a small test tube (15 x 75 mm.) filled with Dry Ice (solid carbon dioxide) so as to constitute a so-called cold finger. In the other hole of the stopper, a wide delivery tube was placed (diameter 10 mm.) leading to the vacuum system. The large test tube, containing the fluoborate, was held in an oil bath which contained a suitable thermometer and which was appropriately shielded to keep Dry Ice from falling into the bath.

For a preliminary period, a vacuum of 130 mm. was drawn in the large test tube, using a water pump, and the bottom of the tube, not yet disposed in the oil bath, was heated gently with a free flame. This action effectuated decomposition of the fluoborate, its completion being indicated by conversion of the yellowish-brown solid to a tarry residue. Thereupon the large tube was placed in the oil bath and an oil pump was attached in lieu of the water pump, so as to bring the vacuum down to a pressure of 3 mm. With the stated low pressure, the oil bath was heated, e.g. with a suitable hot plate. The 2-fluoro compound started to sublime at an oil bath temperature of 135° C. and at 230° C. the sublimation was practically complete. The material condensed on the cold finger, i.e. the exterior of the small test tube, yielding an amount of about 2.0 grams. After recrystallization from benzene and resublimation in the same way as described above, there was a yield of 2-fluoro-9,10-phenanthrenequinone in amount of 0.5 gram. The product consisted of orange-yellow needles having a melting point of 246°–248° C. with partial sublimation. The analysis of the product was: calculated for $C_{14}H_7O_2F$: C, 74.30; H, 3.12; F, 8.41. Found: C, 74.50; H, 3.13; F, 8.16.

It is understood that the step of decomposing the diazonium fluoborate with heat (to the fluoro compound), as described above, involves release of both nitrogen and $BF_3$, the tarry appearance of the residue being believed to result from some polymerization occurring therein as the desired change comes to completion. In this stage, the conditions of heating are limited so as to accomplish the decomposition with minimum loss of the product by volatilization; thereafter, the further heating under higher vacuum effects sublimation of the desired substance, i.e. the fluoro compound, away from the tarry material.

Referring now to the modified process mentioned above, it may be explained that after the step represented by the attainment of compound V in the drawing, i.e. the diazonium chloride of phenanthrenequinone, the next stage is the conversion to the corresponding hexafluorophosphate, i.e. 2-diazonium hexafluorophosphate 9,10-phenanthrenequinone, which is thereafter decomposed in the same improved manner as the fluoborate of the first-described process, to yield the desired product, e.g. the stated fluoro derivative of phenanthrenequinone, with liberation of nitrogen and phosphorus pentafluoride in gaseous form.

By way of specific example of this second mode of procedure, the operations may be exactly the same as in the first example above, through the stage of producing the diazonium chloride, e.g. in solution which was kept at reduced temperature, as below zero degrees C.

Hexafluorophosphoric acid, as available in commerce (for instance, obtained from Ozark-Mahoning Co., Tulsa, Oklahoma), and having a concentration of about 65%, was employed for the next step. Specifically, 8.0 ml. of this acid was cooled to 0° C. and then poured quickly into the chilled diazonium solution (V); this represented about 20% excess of acid. Stirring was continued for two hours and the mixture was then allowed to stand on ice in a refrigerator for 24 hours. By these operations, the diazonium hexafluorophosphate (as named above, corresponding in this process to compound VI) was formed, first into suspension and then collecting as a form of a yellow precipitate in the liquid. The precipitated hexafluorophosphate was thereafter filtered with suction, washed with ice water and dried in a vacuum desiccator, first over concentrated sulfuric acid (Sp. gr. 1.84), and then over phosphorus pentoxide. It was found greatly preferable not to wash the precipitate with alcohol and ether as has been recommended by some investigators, for the case of a different diazonium hexafluorophosphate.

The diazonium hexafluorophosphate (in lieu of compound VI) was thus produced as a dry solid, of yellow-brown character. From 5 to 6 grams of this material were obtained, having started with 10 grams of compound III.

The final reaction stage in the procedure constituted the decomposition of the diazonium hexafluorophosphate and the sublimation of the resulting 2-fluoro compound. Specifically, 6 grams of the hexafluorophosphate was placed in the bottom of a large test tube (45 x 150 mm.), fitted with a two-holed rubber stopper. In one hole of the stopper there was disposed a small test tube (15 x 75 mm.) filled with Dry Ice (solid carbon dioxide) so as to constitute a so-called cold finger. In the other hole of the stopper, a wide delivery tube was placed (diameter 10 mm.) leading to the vacuum system. The large test tube, containing the diazonium hexafluorophosphate, was held in an oil bath which contained a suitable thermometer and which was appropriately shielded to keep Dry Ice from falling into the bath. The procedure just described, and following, for this final stage, was essentially identical in physical operation as for compound VI above.

For a preliminary period, a vacuum of 130 mm. was drawn in the large test tube, using a water pump, and the bottom of the tube, not yet disposed in the oil bath, was heated gently with a free flame. This action effectuated decomposition of the hexafluorophosphate, its completion being indicated by conversion of the yellowish-brown solid to a tarry residue. Thereupon the large tube was placed in the oil bath and an oil pump was attached in lieu of the water pump, so as to bring the vacuum down to a pressure of 3 mm. With the stated low pressure, the oil bath was heated, e.g., with a suitable hot plate. The 2-fluoro compound started to sublime at an oil bath temperature of 135° C. and at 230° C. the sublimation was practically complete. The material condensed on the cold finger, i.e., the exterior of the small test tube, yielding an amount of about 2.0 grams. After recrystallization from benzene and resublimation in the same way as described above, there was a yield of 2-fluoro-9,10-phenanthrenequinone in amount of 2.0 grams. The product consisted of orange-yellow needles having a melting point of 246°–248° C. with partial sublimation. Analysis of the product demonstrated its identity with the product of the first process, viz. the desired 2-fluoro compound, having the elemental composition $C_{14}H_7O_2F$.

As indicated above, the step of decomposing the diazonium hexafluorophosphate with heat, involves release of both nitrogen and $PF_5$, and as in the case of decomposing the diazonium fluoborate, there is a residue of tarry appearance thought to result from some polymerization in such material. Likewise, exactly as in the first example, the conditions of heating are limited so as to accomplish the decomposition with minimum loss of the product by volatilization; thereafter, the further heating under higher vacuum effects sublimation of the desired substance, i.e., the fluoro compound, away from the tarry material.

It was found that the yield in this second procedure was very considerably improved over the first, e.g., by as much as several times, thus indicating a specific advantage for the second. The two procedures may, however, be generically defined as a process embracing the reaction of an acid selected from the class consisting of fluoboric and hexafluorophosphoric acids, with the diazonium chloride of phenanthrenequinone, to produce a diazonium salt correspondingly selected from the class consisting of fluoroborate and hexafluorophosphate, which is thereafter decomposed in the stated manner to yield the fluoro derivative.

The properties of the product, including its utility as a research agent in the experimental investigation of carcinogenic or carcinostatic conditions, have been explained hereinabove, it being noted that the described example of the procedure were highly effective in leading to the production of a pure compound, with good reliability and ease of control. As indicated, like procedure is understood to be applicable to production of the 4-fluoro derivative of phenanthrenequinone, e.g., by selecting the 4-nitro compound, in lieu of the 2-nitro isomer shown at III in the process diagram.

It is to be understood that the invention is not limited to the specific examples herein described, but may be carried out in other ways without departure from its spirit.

I claim:
1. A fluoro derivative of phenanthrenequinone selected from the class consisting of 2-fluoro-9,10-phenanthrenequinone and 4-fluoro-9,10-phenanthrenequinone.
2. 2-fluoro-9,10-phenanthrenequinone.
3. 4-fluoro-9,10-phenanthrenequinone.
4. In a method of making a fluoro derivative of phenanthrenequinone, the steps of establishing a solution of a 2- or 4-amine of phenanthrenequinone in dioxane mixed with water, reacting said amine in said solutions with nitrous acid in the presence of chloride ions to produce a diazonium chloride of phenanthrenequinone, treating said diazonium chloride with fluoboric acid at reduced temperature to precipitate a diazonium fluoborate of phenanthrequinone, and thereafter heating said diazonium fluoborate to decompose the same and to separate a substance selected from the class consisting of 2-fluoro and 4-fluoro derivatives of phenanthrenequinone, by sublimation at reduced pressure.
5. In a method of making a fluoro derivative of phenanthrenequinone, the steps of establishing a solution of 2-amino phenanthrenequinone in dioxane mixed with water, reacting said amino compound in said solution with nitrous acid in the presence of chloride ions to produce the 2-diazonium chloride of phenanthrenequinone, treating said diazonium chloride with fluoboric acid at reduced temperature to precipitate 2-diazonium-fluoroborate-9,10-phenanthrenequinone, and thereafter heating said diazonium fluoborate to decompose the same and to separate 2-fluoro-9,10-phenanthrenequinone by sublimation at reduced pressure.
6. In a method of making a fluoro derivative of phenanthrenequinone, the steps of treating a 2- or 4-nitro derivative of phenanthrenequinone with tin and hydrochloric acid, and treating the resulting reaction product with hydrogen sulfide, to yield an amine of phenanthrenequinone, subjecting said amine to diazotization to produce the diazonium chloride of phenanthrenequinone, reacting said diazonium chloride with fluoboric acid to yield diazonium fluoborate of phenanthrenequinone, and decomposing said fluoborate and subjecting the same to sublimation, to produce a sublimed product comprising a fluoro derivative of phenanthrenequinone, said treatments of the nitro derivative and the said reaction product to yield the amine being effected in a mixture of dioxane and water and said diazotization being thereafter directly effected upon the amine in solution in said dioxane.
7. In a method of making a 2- or 4-fluoro derivative of phenanthrenequinone, the steps of reacting the corresponding diazonium chloride of phenanthrenequinone with fluoboric acid at low temperature to yield a precipitate of diazonium fluoborate, heating said precipitate to decompose the same, said heating of the decomposed precipitate being continued at reduced pressure for vaporizing a fluoro derivative of phenanthrenequinone therefrom, and condensing said fluoro derivative on a chilled surface.
8. In a method of making 2-fluoro-9,10-phenanthrenequinone, the steps of reacting the 2-diazonium chloride of phenanthrenequinone with fluoboric acid at low temperature to yield a precipitate of the 2-diazonium fluoborate of phenanthrenequinone, heating said precipitate to decompose the same, said heating of the decomposed product being continued at reduced pressure for vaporizing 2-fluoro-9,10-phenanthrenequinone therefrom, and condensing said fluoro compound on a chilled surface.
9. In a method of making a 2- or 4-fluoro derivative of phenanthrenequinone, the step of heating the corresponding diazonium fluoborate of phenanthrenequinone under reduced pressure for decomposition of the said diazonium fluoborate, said heating under reduced pressure being continued to yield a vapor of a fluoro derivative of phenanthrenequinone, and condensing said fluoro derivative from the vapor.
10. In a method of making 2-fluoro-9,10-phenanthrenequinone, the step of heating the 2-diazonium fluoborate of phenanthrenequinone under reduced pressure for decomposition of the said diazonium fluoborate, said heating under reduced pressure being continued to yield a vapor of 2-fluoro-9,10-phenanthrenequinone, and condensing said fluoro compound from the vapor.
11. In a method of making a 2- or 4-fluoro derivative of phenanthrenequinone, the steps of establishing a solution of a 2- or 4-amine of phenanthrenequinone in dioxane mixed with water, reacting said amine in said solution with nitrous acid in the presence of chloride ions to produce a diazonium chloride of phenanthrenequinone, treating said diazonium chloride with hexafluorophosphoric acid at reduced temperature to precipitate a diazonium hexafluorophosphate of phenanthrenequinone, and thereafter heating said diazonium hexafluorophosphate to decompose the same and to separate a substance selected from the class consisting of 2-fluoro and 4-fluoro derivatives of phenanthrenequinone, by sublimation at reduced pressure.
12. In a method of making a fluoro derivative of phenanthrenequinone, the steps of establishing a solution of 2-amino phenanthrenequinone in dioxane mixed with water, reacting said amino compound in said solution with nitrous acid in the presence of chloride ions to produce the 2-diazonium chloride of phenanthrenequinone, treating said diazonium chloride with hexafluorophosphoric acid at reduced temperature to precipitate 2-diazonium-hexafluorophosphate-9,10 - phenanthrenequinone, and thereafter heating said diazonium hexafluorophosphate to decompose the same and to separate 2-fluoro-9,10-phenanthrenequinone by sublimation at reduced pressure.
13. In a method of making a 2- or 4-fluoro derivative of phenanthrenequinone, the steps of treating a 2- or 4-nitro derivative of phenanthrenequinone with tin and hydrochloric acid, and treating the resulting reaction product with hydrogen sulfide, to yield an amine of phenanthrenequinone, subjecting said amine to diazotization to produce the diazonium chloride of phenanthrenequinone, reacting said diazonium chloride with hexafluorophosphoric acid to yield diazonium hexafluorophosphate of phenanthrenequinone, and decomposing said hexafluorophosphate and subjecting the same to sublimation, to produce a sublimed product comprising a fluoro derivative of phenanthrenequinone, said treatment of the nitro derivative to yield the amine being effected in a mixture of dioxane and water and said diazotization being thereafter directly effected upon the amine in solution in said dioxane.
14. In a method of making a 2- or 4-fluoro derivative of phenanthrenequinone, the steps of reacting the corresponding diazonium chloride of phenanthrenequinone with an acid selected from the class consisting of fluoboric and hexafluorophosphoric acids at low temperature acids at low temperature to yield a precipitate of diazonium salt correspondingly selected from the class consisting of fluoborate and hexafluorophosphate, heating said precipitate to decompose the same, said heating of the decomposed precipitate being continued at reduced pressure for vaporizing a fluoro derivative of phenanthrenequinone therefrom, and condensing said fluoro derivative on a chilled surface.

15. In a methd of making 2-fluoro-9,10-phenanthrenequinone, the steps of reacting the 2-diazonium chloride of phenanthrenequinone with hexafluorophosphoric acid at low temperature to yield a precipitate of the 2-diazonium hexafluorophosphate of phenanthrenequinone, heating said precipitate to decompose the same, said heating of the decomposed product being continued at reduced pressure for vaporizing 2-fluoro-9,10-phenanthrenequinone therefrom, and condensing said fluoro compound on a chilled surface.

16. In a method of making a 2- or 4-fluoro derivative of phenanthrenequinone, the step of heating the corresponding diazonium hexafluorophosphate of phenanthrenequinone under reduced pressure for decomposition of the said diazonium hexafluorophosphate, said heating under reduced pressure being continued to yield a vapor of a fluoro derivative of phenanthrenequinone, and condensing said fluoro derivative from the vapor.

17. In a method of making 2-fluoro-9,10-phenanthrenequinone, the step of heating the 2-diazonium hexafluorophosphate of phenanthrenequinone under reduced pressure for decomposition of the said diazonium hexafluorophosphate, said heating under reduced pressure being continued to yield a vapor of 2-fluoro-9,10-phenanthrenequinone, and condensing said fluoro compound from the vapor.

References Cited by the Examiner

Beilsteins: "Handbuch der Organischen Chemie," 4th ed,. vol. 7, H.W., pp. 804–7 (Springer) (1925).

Fieser et al.: "Organic Chemistry," 3rd ed., p. 757 (Reinhold) (1956).

"Organic Reactions," vol. 5, pp. 194–96 and 224, (Wiley) (1949).

LORRAINE A. WEINBERGER, *Primary Examiner.*

IRVING MARCUS, LEON ZITVER, *Examiners.*

R. T. BOND, D. P. CLARKE, L. A. THAXTON, *Assistant Examiners.*